(12) United States Patent
Billy et al.

(10) Patent No.: US 6,173,585 B1
(45) Date of Patent: Jan. 16, 2001

(54) PROCESS FOR THE PRODUCTION OF CARBON MONOXIDE

(75) Inventors: Jean Billy, Plessis Trevise; Francois Fuentes, Paris; Nathalie Sosson, Saint-Maur-des-Fosses, all of (FR)

(73) Assignee: L'Air Liquide, Societe Anonyme pour l'Etude et l'Exploitation des Procedes Georges Claude, Paris Cedex (FR)

( * ) Notice: Under 35 U.S.C. 154(b), the term of this patent shall be extended for 0 days.

(21) Appl. No.: 09/340,126

(22) Filed: Jun. 28, 1999

(30) Foreign Application Priority Data

Jun. 26, 1998 (FR) ................................................ 98 08139

(51) Int. Cl.[7] ................................................ F25J 1/00
(52) U.S. Cl. .................................... 62/624; 62/920
(58) Field of Search ................................ 62/624, 920

(56) References Cited

U.S. PATENT DOCUMENTS

| | | | | |
|---|---|---|---|---|
| 4,589,896 | * | 5/1986 | Chen et al. ............................. | 62/624 |
| 4,732,583 | * | 3/1988 | DeLong et al. ......................... | 62/624 |
| 5,592,831 | * | 1/1997 | Bauer et al. ............................ | 62/920 |
| 5,609,040 | * | 3/1997 | Billy et al. .............................. | 62/920 |
| 5,685,172 | * | 11/1997 | Darredeau et al. .................... | 62/920 |

FOREIGN PATENT DOCUMENTS

| | | |
|---|---|---|
| 42 10 638 | 3/1993 | (DE) . |
| 43 25 513 | 12/1994 | (DE) . |
| 0 213 525 | 3/1987 | (EP) . |
| 0 359 629 | 3/1990 | (EP) . |
| 0 677 483 | 10/1995 | (EP) . |

* cited by examiner

*Primary Examiner*—Ronald Capossela
(74) *Attorney, Agent, or Firm*—Young & Thompson

(57) ABSTRACT

An apparatus for the cryogenic separation of a mixture containing at least hydrogen, carbon monoxide and methane comprises two phase separators (A, H), two heat exchangers (D, K) and two stripping columns (B, I). The mixture cooled in the first exchanger is sent into a phase separator and at least some of the condensed fraction is sent into the first stripping column (B). At least some of the head gas from the stripping column is sent into the second phase separator (H) and the liquid produced is sent into the head of the second stripping column (I). The base liquid from the first stripping column may be sent into a purification column (C).

17 Claims, 2 Drawing Sheets

PROCESS FOR THE PRODUCTION OF CARBON MONOXIDE

FILED OF THE INVENTION

The present invention relates to a process and to a plant for the separation of a gas mixture containing hydrogen, carbon monoxide and small amounts of impurities (methane and inert gases) in order to produce hydrogen and carbon monoxide as pure products.

BACKGROUND OF THE INVENTION

In the conventional process called "partial condensation", the hydrogen separated from the gas mixture, after being cooled to a low temperature, is expanded to a pressure of about 5 to 10 bar so as to provide the refrigeration for keeping the plant cold and to cool the gas mixture to below −200° C. A plant of this type is described in U.S. Pat. No. 4,217,759 and uses at least four columns to produce carbon monoxide with a yield of 95% and a purity of approximately 99%. The hydrogen yield is about 99.9%, with a purity of approximately 95%.

The object of the invention is to simplify the process and the plant by reducing the number of columns used for the separation steps, but still maintaining these high purities and yields. Thus, the scrubbing columns usually placed at the head of the process and the distillation column for carbon monoxide/methane separation are eliminated.

The object of the invention is also to ensure that the coldest temperature in the plant is above that of the conventional process, with comparable hydrogen purities and carbon monoxide yields.

DE-A-2,460,515 describes a methane-contaminated hydrogen separation apparatus comprising a first separator, a first stripping column receiving the gas from the first separator, means for sending the head gas into a second separator and means for sending the liquid from the second separator into a second column fed with the liquid from the first separator.

EP-A-0,017,174 describes an apparatus for separating a mixture of carbon monoxide, hydrogen and methane, in which the mixture is partially condensed and the condensed portion is sent into the head of a first stripping column. The head gas from the stripping column is cooled and sent into a second phase separator. The liquid portion is sent into a second column. The base liquid from the second column is fed into the head of a third column and the uncondensed portion from the first phase separator is fed into this base of the third column.

The object of the present invention is also to provide a plant having a lower investment cost than in the prior art, by dispensing with any means of refrigeration.

The invention makes it possible in some cases to achieve complete hydrogen recovery and to obtain the hydrogen at a pressure greater than that obtained in the conventional process.

SUMMARY OF THE INVENTION

For this purpose, the subject of the invention is a process for the production of carbon monoxide and hydrogen from a gas mixture which essentially comprises these two substances and methane, the process comprising the following steps:

cooling the gas mixture to be treated so as to partially condense it;

separating a condensed portion of the mixture from an uncondensed portion containing mainly hydrogen in a first phase separator;

sending at least one fraction of the condensed portion into a first stripping column in order to produce a gas fraction containing hydrogen at the head of the column and a liquid fraction containing carbon monoxide and methane at the base of the column;

sending at least some of the head gas from the first stripping column into a second heat exchanger in order to partially condense it and to form a two-phase fluid;

separating the two-phase fluid into a condensed portion and an uncondensed portion containing mainly hydrogen in a second phase separator;

sending at least one fraction of the condensed portion into a second stripping column in order to produce a hydrogen-rich gaseous portion at the head and a carbon-monoxide-rich liquid fraction at the base, characterized in that the uncondensed portion is warmed and recycled into the mixture to be treated, or withdrawn.

At least some of the liquid fraction from the first stripping column may be sent into a purification column in order to produce substantially pure carbon monoxide at the head of the column and a methane-rich liquid at the base of the column.

Optionally, some of the head gas from the first stripping column (B) and/or at least some of the hydrogen-rich gas coming from the first phase separator is sent into a permeation unit or an adsorption unit and a carbon-monoxide-enriched gas is sent from the permeation unit or adsorption unit into the gas mixture to be treated.

Alternatively, some of the head gas from the first stripping column is recycled into the gas mixture to be treated without passing through a permeation unit or adsorption unit.

If the pressure of the mixture to be treated is high, the energy of separation is entirely provided by Joule-Thomson expansion of the starting mixture. Thus, the apparatus does not include expansion turbines, even for expanding a cycle gas.

If this is not the case, some of the energy of separation is provided by heat exchange between the gas mixture to be treated and a cryogenic liquid, or by injecting a cryogenic liquid into one of the columns or by means of a refrigeration cycle using an autonomous refrigerant.

Otherwise, the uncondensed portion from the second phase separator may be expanded in a turbine.

At most 15%, and preferably at most 10% of the mixture to be treated is sent into the second phase separator.

Preferably, the mixture to be treated contains less than 1% methane.

The head gas of the first stripping column may contain between 60 and 80% hydrogen and preferably between 71 and 74% hydrogen.

The base liquid of the first stripping column may contain between 95 and 99.9% carbon monxide and preferably between 98.8 and 99.1% carbon monoxide.

The subject of the invention is also a plant for the production of carbon monoxide and hydrogen from a gas mixture which essentially comprises these two substances and small amounts of methane and impurities, the plant comprising:

a first heat exchanger, a first phase separator, a first stripping column, means for cooling the gas mixture to be treated in the first heat exchanger, means for introducing at least some of the cooled gas mixture into the first phase separator and for withdrawing therefrom a gaseous portion, essentially comprising hydrogen, and a liquid portion, means for sending at least one fraction of the liquid portion into the stripping column for withdrawing therefrom a liquid containing mainly carbon monoxide and methane;

a second heat exchanger, a second phase separator, a second stripping column, means for sending at least some of the head gas from the first stripping column into the second heat exchanger and then into the second phase separator, means for sending at least some of the condensed portion from the second phase separator into the second stripping column and means for withdrawing a hydrogen-rich gas and a carbon-monoxide-rich liquid from the second stripping column, characterized in that it comprises means for heating the gaseous portion from the first phase separator. The plant may comprise a purification column and means for sending at least some of the base liquid from the first stripping column into the head of the purification column and means for withdrawing a carbon-monoxide-enriched head gas and a methane-enriched base liquid.

Preferably, the liquid from the second phase separator is sent into the head of the second stripping column.

The plant may comprise means for separating a gas by permeation or adsorption, means for sending some of the head gas from the first stripping column and/or at least some of the uncondensed portion from the first phase separator into permeation or adsorption separation means, this gas being mixed in order to produce a carbon-monoxide-enriched gas fraction, and means for sending this fraction back into the mixture to be treated.

The plant may comprise a refrigeration cycle using an autonomous refrigerant and/or a turbine and means for sending an uncondensed portion from the second phase separator into the turbine.

In some cases, the first stripping column does not have a head condenser and the second stripping column does not have a base reboiler.

The head gas from the first stripping column may also be mixed with the hydrogen-rich gas coming from the first phase separator upstream of the permeation unit or adsorption unit. Only the carbon-monoxide-enriched gaseous portion is then recycled into the charging gas.

Optionally, the head gas from the first stripping column may be recycled into the starting gas without passing through the permeation unit or adsorption unit.

If the pressure of the starting mixture is high enough, the entire energy of separation may be provided by Joule-Thomson expansion of the starting mixture.

If this is not the case, some of the energy of separation is provided by heat exchange between the starting mixture and a cryogenic liquid and/or by means of a refrigeration cycle using an autonomous refrigerant.

The plant may comprise means for sending at least some of the head gas from the first stripping column into the permeation or adsorption separation means, this gas being mixed with the carbon-monoxide-enriched gaseous portion, and/or means for recycling at least some of the head gas from the first stripping column into the gas mixture to be treated.

It may comprise a refrigeration cycle using an autonomous refrigerant.

In this case, the use of refrigeration is limited to the coldest part of the process, which treats only a fraction (approximately 10%) of the initial gas mixture.

In some of the processes according to the invention, it is no longer needed to cool the gas to be treated down to −200° C. as previously—a temperature of −175° C. is sufficient for the separation process.

Overall, the investment corresponding to the plant according to the invention is approximately 12% less than that of the processes known for this separation.

BRIEF DESCRIPTION OF THE DRAWINGS

Further characteristics and advantages of the invention will become clearer from the description which follows, given with reference to the appended drawings among which.

DETAILED DESCRIPTION OF THE INVENTION

Figure 1:
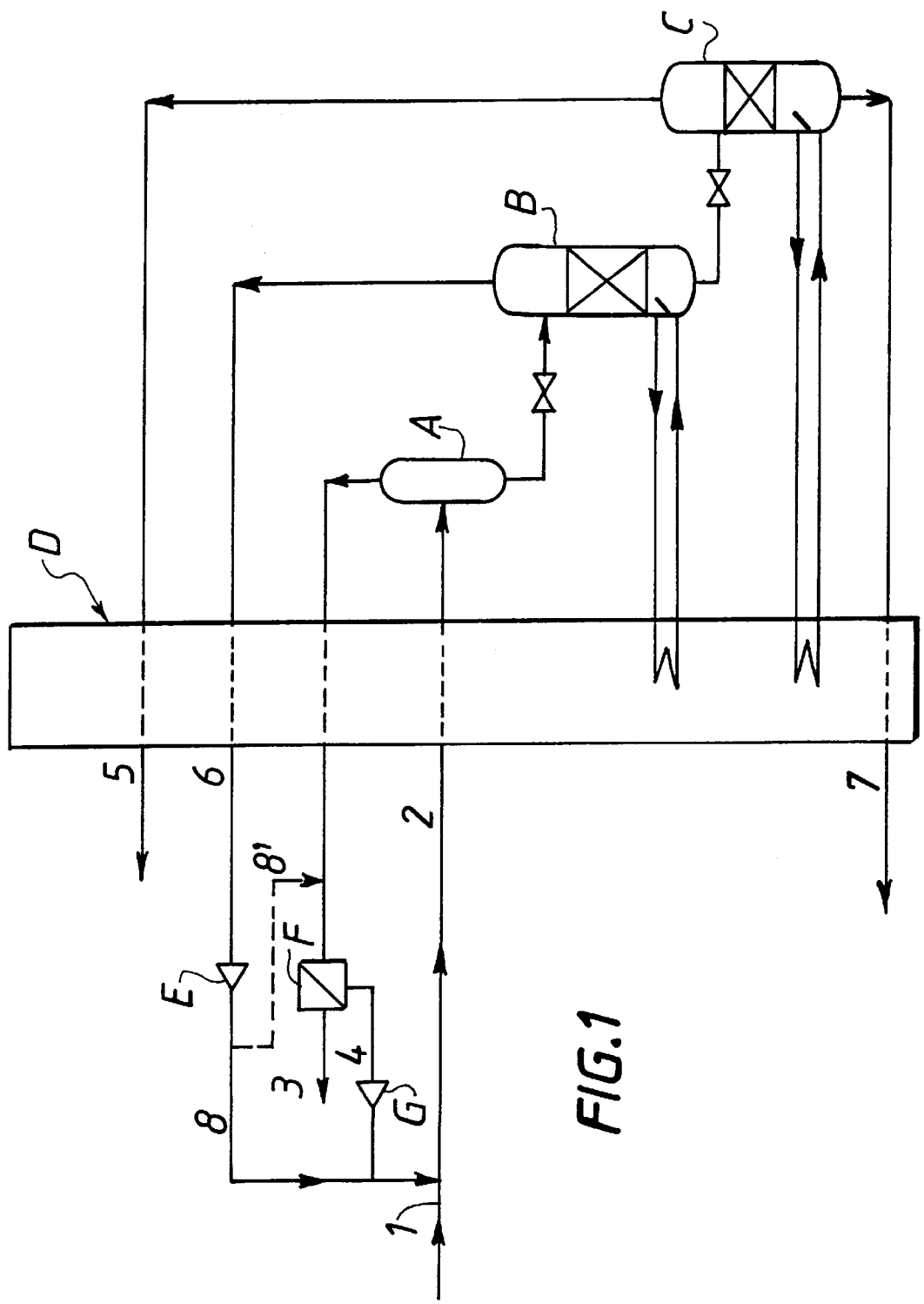
FIG. 1 is a diagram showing the principle of a separation operation.

In the system illustrated in FIG. 1, a synthesis gas mixture 1 contains residual methane, as well as hydrogen and carbon monoxide. This mixture characteristically contains 50 to 70 mol % of hydrogen, 15 to 45 mol % of carbon monoxide and 0.2 to 0.6 mol % of methane, together with small amounts of impurities.

The gas mixture to be treated, available at 60 bar, passes along the line 2 and is cooled to a temperature of approximately −175° C. in the exchanger D, from which it leaves partially condensed. A liquid fraction and a gas fraction are withdrawn from the first phase separator A. The gas fraction contains mostly hydrogen and is warmed up in the first exchanger D before being sent into a permeation unit F which produces a carbon-monoxide-rich residue 4 and a pure hydrogen permeate 3 produced at 20 bar.

All of the liquid fraction, containing mainly hydrogen and carbon monoxide, is expanded in a valve, in order to reduce its pressure, and is introduced in its entirety into the head of the first stripping column B at 20 bar.

The flash gas containing hydrogen coming from this column B is warmed up in the exchanger D.

All of the liquid coming from this column B at −151.7° C., which is composed mainly of carbon monoxide, is then expanded at −177.7° C. and sent into the head of a purification column C at 4 bar as the only feed to the column, in order to produce, as head gas, pure carbon monoxide and, at the base, a methane-enriched liquid. The carbon monoxide and the base liquid, containing methane and heavy impurities, are withdrawn, respectively via the lines 5 and 7, and warmed up in the exchanger D.

If the gas mixture to be treated were to be available at a high enough pressure, it would be possible to dispense with any means of refrigeration since the heat losses are compensated for by the Joule-Thomson effect on the gas to be treated.

If this is not the case, a means of refrigeration (injection of liquid nitrogen at the cold end of the exchanger or an independent refrigeration cycle like that in EP-A-677483) may be added to the system.

The base of the stripping column B and the base of the purification column C are warmed by partially vaporizing, in the exchanger D, the liquid from the first tray starting from the base.

The carbon-monoxide-rich residual gas 4 coming from the permeation unit F and the flash gas 6 coming from the stripping column are recompressed by the compressors G, E respectively, and re-injected into the charging gas.

As a variant, the flash gas 6 may also be recycled upstream of the permeation unit F (stream 8' instead of 8) after having been compressed.

This process makes it possible to achieve complete hydrogen recovery and to obtain the hydrogen at a higher pressure than that obtained using the conventional process.

Figure 2:
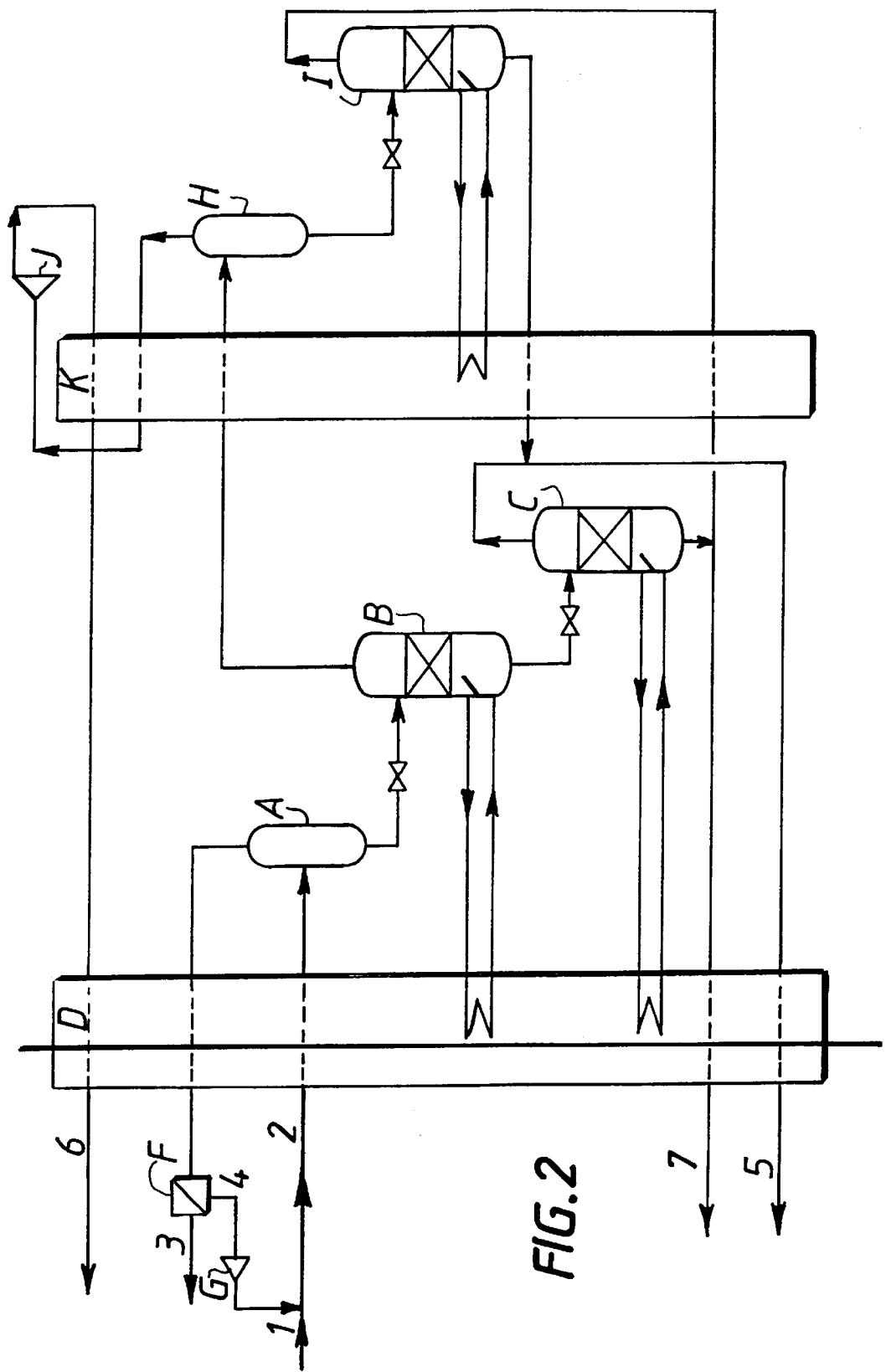
FIG. 2 is a diagram showing the principle of a separation operation according to one embodiment of the invention.

In FIG. 2, the plant is identical to that in FIG. 1 apart from the following differences:

the head gas from the first stripping column B (containing approximately 10% of the gas mixture to be treated) is not sent into the exchanger D but into a second exchanger K where it cools to a temperature of −200° C. in order to leave partially condensed. After separation in a phase separator H, a gas portion containing mostly hydrogen is warmed in the exchanger K, expanded in a turbine J (or two turbines in series) and then warmed up in the exchangers K and D and withdrawn at 6. The liquid portion from the phase separator H, containing mainly hydrogen and carbon monoxide, is expanded in a valve, in order to reduce its pressure, and introduced into the head of a second stripping column I at 4 bar, as the only feed to the latter. The liquid coming from this second column I, which is pure carbon monoxide, is vaporized in the second exchanger K, mixed with the pure carbon monoxide coming from the head of the purification column C, warmed up in the exchanger D and withdrawn at 5.

Alternatively, the two streams of carbon monoxide from the columns C and I may be recovered at different pressures. For example, the liquid carbon monoxide from the column I may be pumped and vaporized at K at high pressure.

The head gas containing mainly hydrogen is warmed up in the exchanger K, mixed with the base liquid from the column C, containing methane and the heavy impurities, warmed up in the first exchanger D and withdrawn via the line 7.

Obviously, in this case some of the head gas from the first stripping column may be recycled into the mixture to be treated after a compression step and possibly after a separation step.

In both situations, the permeation separation unit F may be replaced by an adsorption separation unit.

What is claimed is:
1. Process for the production of carbon monoxide and hydrogen from a gas mixture to be treated which essentially comprises these two substances and methane, the process comprising the following steps:

cooling the gas mixture to be treated (2) so as to partially condense it;

separating a condensed portion of the mixture from an uncondensed portion containing mainly hydrogen in a first phase separator (A);

sending at least one fraction of the condensed portion into a first stripping column (B) in order to produce a gas fraction containing hydrogen at the head of the column and a liquid fraction containing carbon monoxide and methane at the base of the column;

sending at least some of the head gas from the first stripping column (B) into a second heat exchanger (K) in order to partially condense it and to form a two-phase fluid;

separating the two-phase fluid into a condensed portion and an uncondensed portion containing mainly hydrogen in a second phase separator (H);

sending at least one fraction of the condensed portion into a second stripping column (I) in order to produce a hydrogen-rich gaseous portion at the head and a carbon-monoxide-rich liquid fraction at the base, characterized in that the uncondensed portion is warmed and recycled into the mixture to be treated, or withdrawn.

2. Process according to claim 1, in which at least some of the liquid fraction from the first stripping column (B) is sent into a purification column (C) in order to produce substantially pure carbon monoxide at the head of the column and a methane-rich liquid at the base of the column.

3. Process according to claim 1, in which some of the head gas from the first stripping column (S) and/or at least some of the hydrogen-rich gas coming from the first phase separator is sent into a treatment unit selected from one of a permeation unit and an adsorption unit, and a carbon-monoxide-enriched gas is sent from the treatment unit into the gas mixture to be treated.

4. Process according to claim 1, in which some of the head gas from the first stripping column (B) is directly recycled into the gas mixture to be treated.

5. Process according to claim 1, in which the energy of separation is entirely provided by Joule-Thomson expansion of the starting mixture.

6. Process according to claim 1, in which some of the energy of separation is provided by heat exchange between the gas mixture to be treated and a cryogenic liquid, or by injecting a cryogenic liquid into one of the columns.

7. Process according to claim 1, in which some of the energy of separation is provided by means of a refrigeration cycle using an autonomous refrigerant.

8. Process according to claim 1, comprising the step of expanding the uncondensed portion from the second phase separator (H) in a turbine (J).

9. Process according to claim 1, in which at most 15% of the mixture to be treated is sent into the second phase separator (H).

10. Plant for the production of carbon monoxide and hydrogen from a gas mixture which essentially comprises these two substances and small amounts of methane and impurities, the plant comprising:

a first heat exchanger (D), a first phase separator (A), a first stripping column (B), means for cooling the gas mixture to be treated in the first heat exchanger, means (1, 2) for introducing at least some of the cooled gas mixture into the first phase separator and for withdrawing therefrom a gaseous portion, essentially comprising hydrogen, and a liquid portion, means for sending at least one fraction of the liquid portion into the first stripping column and means for withdrawing therefrom a liquid containing mainly carbon monoxide and methane;

a second heat exchanger (K), a second phase separator (H), a second stripping column (I), means for sending at least some of the head gas from the first stripping column into the second heat exchanger and then into the second phase separator, means for sending at least some of the condensed portion from the second phase separator into the second stripping column and means for withdrawing a hydrogen-rich gas and a carbon-monoxide-rich liquid from the second stripping column, characterized in that it comprises means for heating the gaseous portion from the first phase separator.

11. Plant according to claim 10, comprising a purification column (C) and means for sending at least some of the base liquid from the first stripping column into the head of the purification column and means for withdrawing a carbon-monoxide-enriched head gas and a methane-enriched base liquid.

12. Plant according to claim 10, comprising means for sending the liquid from the second phase separator (H) to the head of the second stripping column (I).

13. Plant according to claim 10, comprising means (F) for separating a gas by one of permeation and adsorption, means (8') for sending some of the head gas from the first stripping column (B) and/or at least some of the uncondensed portion from the first phase separator (A) into separation means selected from one of a permeation unit and an adsorption unit, this gas being mixed in order to produce a carbon-monoxide-enriched gas fraction, and means for sending this fraction back into the mixture to be treated.

14. Plant according to claim 10, comprising a refrigeration cycle using an autonomous refrigerant.

15. Plant according to claim 10, comprising a turbine (J) and means for sending an uncondensed portion from the second phase separator (H) into the turbine (J).

16. Plant according to claim 10, in which the first stripping column does not have a head condenser.

17. Plant according to claim 10, in which the second stripping column does not have a base reboiler.

* * * * *